Feb. 9, 1943. H. M. GERSMAN 2,310,230
EXTRUSION PRESS
Filed Aug. 10, 1939 3 Sheets-Sheet 2

INVENTOR.
HARVEY M. GERSMAN
BY
Horace B. Fay
ATTORNEY.

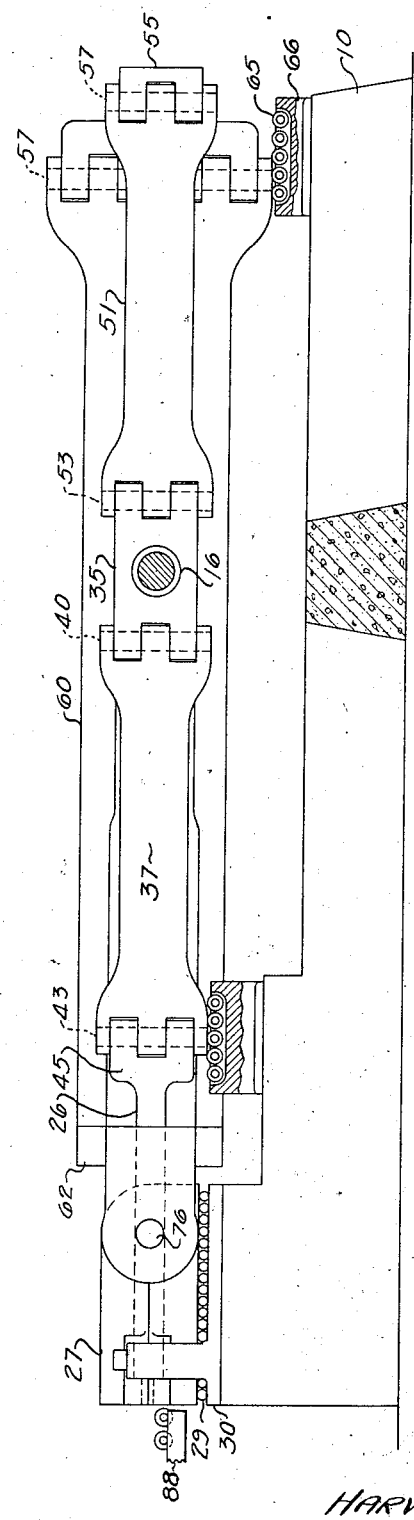

Patented Feb. 9, 1943

2,310,230

UNITED STATES PATENT OFFICE 2,310,230

EXTRUSION PRESS

Harvey M. Gersman, New York, N. Y., assignor to Ferrex Corporation, New York, N. Y., a corporation of Delaware Application August 10, 1939, Serial No. 289,445

8 Claims. (Cl. 207—9)

This invention relates to a press for use in extruding metal and is particularly directed to a simple and rigid construction of great strength which may be used at very high operating pressures.

Extrusion presses have been built for many years, but have always been limited in the pressures they could attain by the power available, together with the structural limitations imposed upon the parts due to the available space. Any machine heretofore built, as far as I know, which could even partially overcome these objections was enormously expensive.

My press employs the toggle or knuckle joint principle which is old and has been used in presses and the like for many years. Toggle presses heretofore used, however, have been very slow operating and available only with relatively short strokes and then in heavy cumbersome machines which, compared to my present invention, were expensive.

The chief object of my invention has been to provide a simple, efficient extrusion press employing the toggle principle, with operating mechanism rendering it available for fast production uses at very high extrusion pressures. Still another object has been to hold the material under tension after it leaves the orifice to hold it straight. Other objects of the invention will become apparent from the following description and from the annexed drawings.

Generally speaking, my improved press is mounted horizontally about a large central screw carrying both a right and left hand thread and which is suitably journalled on a concrete or similar foundation. A block is carried by the right and left hand screw surfaces respectively and these are correspondingly threaded such that rotation of the screw moves the two blocks toward each other or away from each other. The screw is driven in the working direction by power applied through large flywheels at each end thereof, which in turn are driven by any suitable prime mover. The connection between the screw and flywheels is effected by a pair of air clutches so connected that the air pressure equalizes in the clutch parts and the two flywheels are simultaneously engaged with the screw.

A die and ram are slidably mounted on the foundation and are movable with respect to each other and to the foundation in a direction transversely of the screw. The ram is operatively connected to the blocks respectively by a pair of link members, and the die is connected through a tension rod extending beyond the screw and secured to the ends of two links lying oppositely of the first named links. Thus, as the screw is rotated to bring the blocks together, the extrusion operation is performed by moving the ram and die orifice section toward each other to compress the slug of material therein.

A table or conveyor is mounted adjacent the orifice to handle the extruded material. Since the die moves away from the conveyor during extrusion tension is set up in the extruded piece near the orifice and this holds the freshly extruded piece from bending, an especially likely thing if the extruded piece is too hot.

Automatic mechanism is provided, as hereinafter described, to control the operation of the parts and to provide for ready removal of the residual slug and replacement of a new slug in its place.

To the accomplishment of the foregoing and related ends, said invention, then, consists of the elements hereinafter fully described and particularly pointed out in the claims; the annexed drawings and the following description setting forth in detail certain structure embodying the invention, such disclosed elements constituting, however, but one of various structural forms in which the principle of the invention may be used.

In said annexed drawings:

Fig. 2 is a side elevation thereof;

Figure 1:
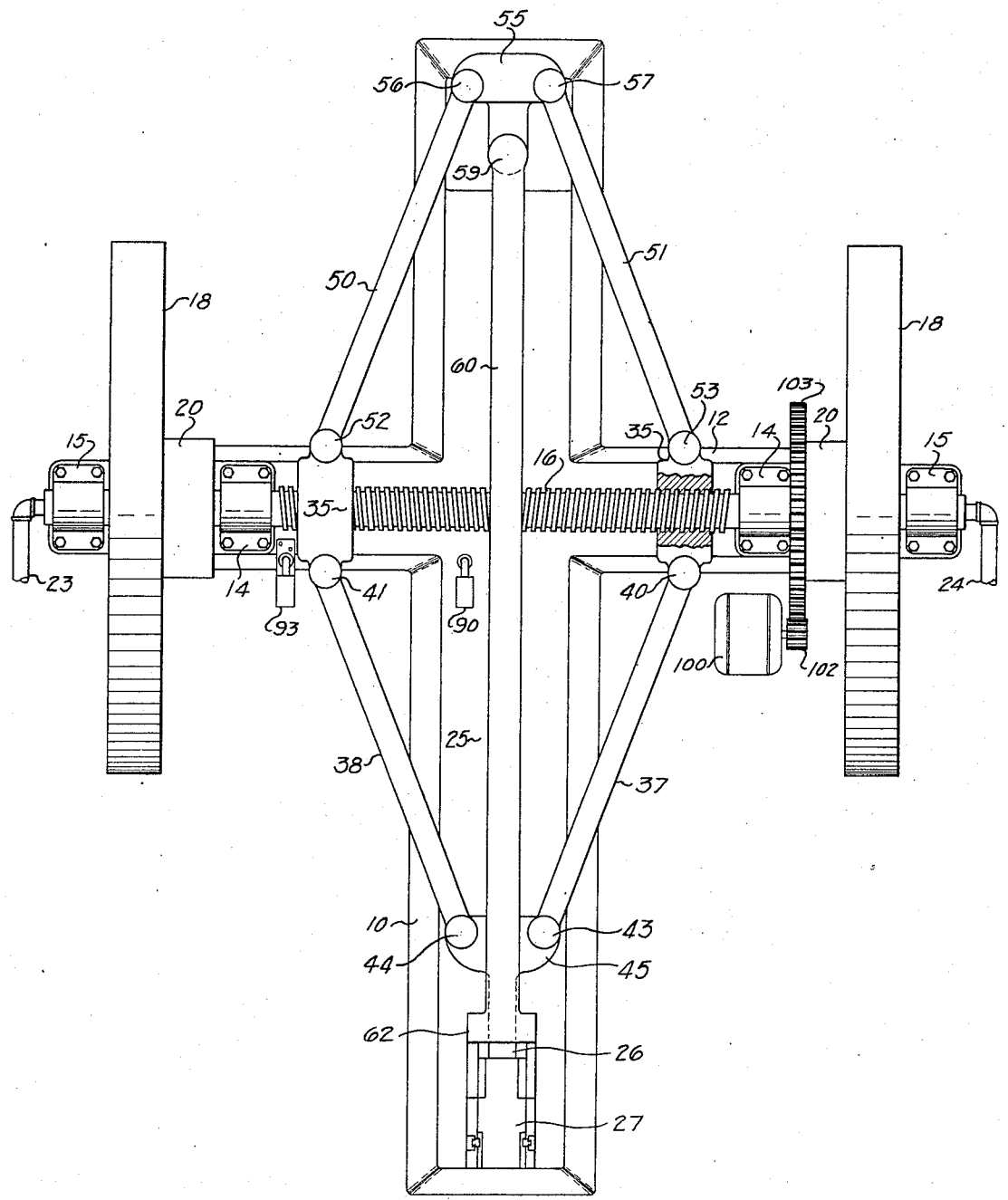
Fig. 1 is a plan view of my improved press.

Referring to the drawings, my press will be seen as mounted horizontally on a cast concrete foundation 10. This foundation is preferably cross-shaped, as shown in Fig. 1. The advantage of such a construction, as will be hereinafter apparent, is that no steel frame for the machine is required, as has heretofore been customary. Instead the various movable parts may be shipped to the scene of installation and the frame then built there at a minimum of expense and with no shipping charges.

The driving mechanism is mounted at each end of a cross-arm 12 of the frame in two pairs of journals 14 and 15. These journals support a screw 16 extending completely across the frame. As shown in Fig. 1, that part of the screw on one side of the machine axis carries a right-hand thread and the corresponding part on the other side a left-hand thread.

Idly carried on the screw between each pair of journals 14 and 15 are two flywheels 18 cut from cast slabs to permit the requisite rotative inertia at a minimum cost and with a maximum of strength. The flywheels in turn are driven by a suitable prime mover as a large electric motor. The drive may be effected by belts or gears as desired.

Air clutches, as indicated at 20, are provided adjacent each flywheel to couple the same to the screw and are of any well known construction familiar to those skilled in the art. They are actuated by air under pressure from a single source 22, connecting through piping 23 and 24 with the respective clutches. By this means the fluid pressure in the system is always equalized and the engaging pressure in each clutch is the same at all times. Therefore, the two flywheels will be engaged with the screw 16 simultaneously and released simultaneously.

Figure 3:
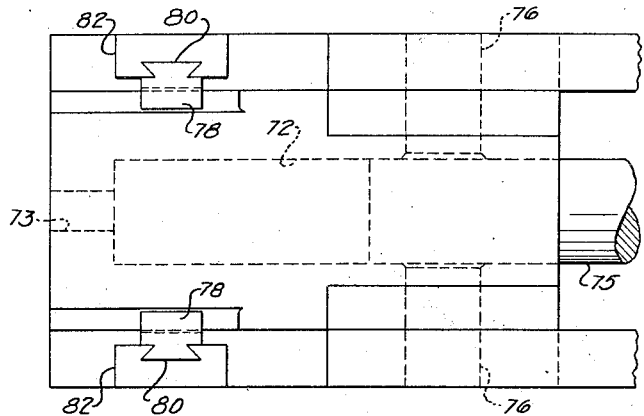
Fig. 3 is a top view adjacent the die showing the parts on an enlarged scale.
Figure 5:
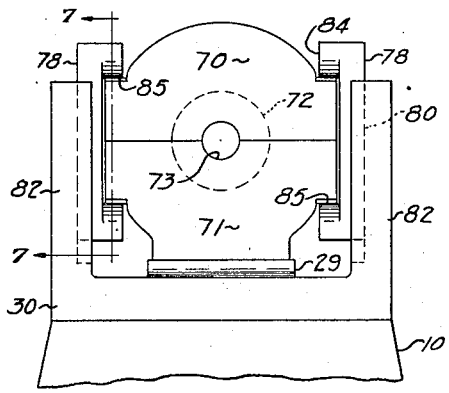
Fig. 5 is an end view looking into the die orifice on an enlarged scale.
Figure 4:
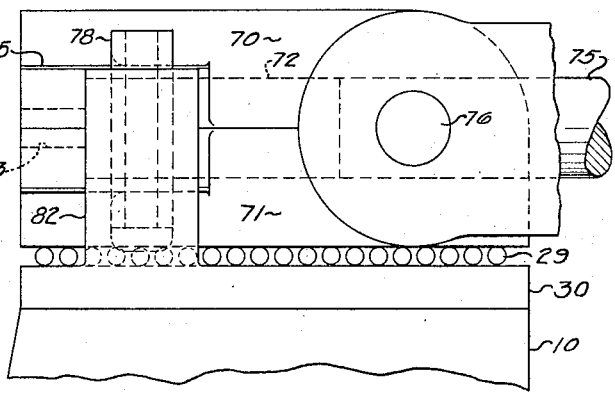
Fig. 4 is a side view of the same portion of the press.

The long arm of the frame, indicated at 25, carries at one end thereof a ram and die. The ram is indicated generally at 26 and the die at 27, and the parts are best shown in Figs. 3, 4 and 5. Both the ram and die are slidably carried on rollers 29, mounted in a steel bed 30 bolted to the foundation 10.

From the description thus far, it will be apparent that both the die and ram are movable along an axis parallel with the frame arm 25, not only with respect to each other but with respect to the foundation.

To actuate the die and ram, a pair of threaded blocks 35 are provided, each of which is threaded to be driven by a corresponding right or left thread of the screw 16, such that rotation of the screw either moves the blocks toward each other or away from each other. A pair of links 37 and 38 are pivotally mounted on respective blocks at 40 and 41 and the other ends of the links are pivotally carried at 43 and 44 by a fish-tail extension 45 of the ram 26.

The die 27 is moved by the blocks 35 at the same time they actuate the ram. To this end links 50 and 51 are pivoted at 52 and 53 to the blocks and are also pivoted to a T-head 55, at 56 and 57. Also connected to the T-head at 59 are a pair of tension members 60 which are in turn firmly fastened to the die, as at 62. All the pivoted connections between the links and their associated parts are in the form of large hinges, the parts of which are connected by hardened steel pintles.

From the description thus far, it will be apparent that as the clutches 20 are actuated to engage the flywheels with the screw, the blocks 35 can be moved toward each other, exerting a toggle pressure on a slug in the die ahead of the ram. As this pressure is exerted and the die and the ram moved toward each other, they shift over the rollers 29 to each move with respect to the foundation 10. In like manner, the T-member 55 is slidably carried with respect to the foundation by rollers 65 which are carried in a steel block 66 suitably secured to the foundation.

The die portion of my press is designed for rapid production work and ready replacement of the residual slug by a new slug. Thus, that portion of my press adjacent the die and ram end is built as best shown in Figs. 3, 4 and 5.

Referring to Fig. 4, it will be seen that the die comprises two portions 70 and 71, which combine to provide a hollow slug receiving interior 72, terminating in an orifice 73 through which the material is extruded. The ram 26 is provided with an end 75 passing through the die from the right-hand end thereof (Fig. 4), to effect the extrusion operation. The two parts of the die are pivoted together by two short pins 76 (Fig. 3).

Figure 7:
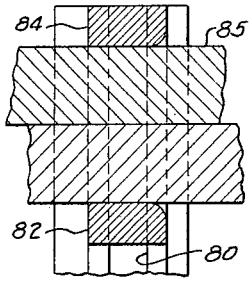
Fig. 7 is a detail of the die lock.

The die parts are locked together during the extrusion operation and are opened at the end of the same for the purposes above set out. To lock the parts together, a pair of locking stirrups 78 are provided, each vertically slidable in a dove-tail 80 formed in upstanding arms 82 of the base 30. Each stirrup is provided with a pair of lugs 84 which contact with bosses 85 of the respective die portions 70 and 71, and cam thereagainst to hold the die closed. The portions of the lugs engaging with the bosses carry hard wear-receiving plates, through which actual contact is effected. The plates are tapered to provide a cam surface during engagement with the bosses, as shown in Fig. 7. The bosses in turn are of such a length that the dies are cammed shut and locked for an interval beginning shortly after the ram and die commence to move until the entire extrusion stroke is completed and the parts are returned to their initial position, as shown in Fig. 1.

To handle the material as it is extruded, a conveyor 88 is provided adjacent the die orifice. This conveyor not only handles the material but cooperates with the receding die to place the material under tension near the orifice due to the drag of the material on the conveyor.

In operation, the construction just described, functions as follows: After a slug has been placed in the die, the upper portion 70 is dropped onto the lower portion and the extrusion operation commenced by engaging the flywheels with the screw 16. During the initial movement of the die and ram with respect to each other and while clearance between the ram and slug is being taken up, the die moves toward the right (Fig. 2) to bring the bosses 85 and the lugs 84 into locking engagement with each other. This locking engagement persists throughout the extrusion stroke. At the end of this stroke, the screw 16 is reversed, as hereinafter described, and the parts returned to their initial position. Prior to attaining this initial position, the bosses 85 ride out of engagement with the lug 84, unlocking the die parts 70 and 71 for opening about the pivot 76.

Figure 6:
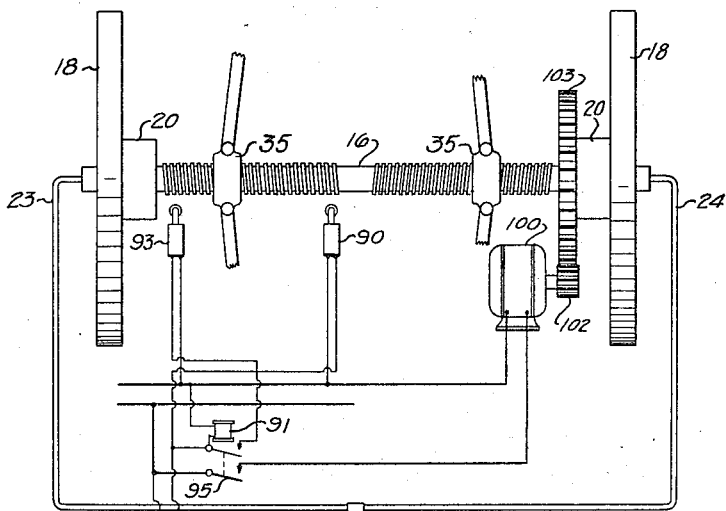
Fig. 6 is a wiring diagram showing the automatic control of the parts.

The entire press is mounted for automatic operation and is controlled by means of the wiring diagram, shown in Fig. 6. A normally open limit-switch 90 is mounted on the machine frame as shown in Fig. 1 and will be contacted by one of the blocks 35 at the end of the extrusion stroke. As this switch is closed, current flows from the supply lines through a solenoid 91 to actuate the same and close the double arm switch 95. As this switch is closed, current may flow through a normally closed limit-switch 93, to hold the switch 95 closed after the switch 90 has again been opened, as hereinafter described.

The clutches are disconnected simultaneously with the energizing of the solenoid 91 by energizing the switch 97 to open a valve 90, discharging the air in the clutches to atmosphere. The valve 98 once opened, remains open until it is manually closed at the beginning of the next press operation.

An electric motor 100 with a compound field is connected into the line when the switch 95 is closed to return the blocks 35 and the related parts of the mechanism to the initial position shown in Fig. 1. A compound motor with a series and shunt field is provided, the first field being employed to attain a high starting torque and the second field to prevent burning out the armature as the motor is rotated in reverse during the extrusion operation. The motor drives a pinion 102 meshing with a gear 103 carried by the screw 16 (Fig. 1).

When the motor has returned the blocks to their initial position, the normally closed switch 93 is opened and this disengages the solenoid 91 allowing the switch 95 to open and the motor to stop.

At the end of the extrusion operation when the switch 90 is actuated, the machine will continue running for a short period of time due to the inertia of the parts, but will quickly be brought to rest due to the resistance of the slug. Similarly, it will take a short interval of time for the solenoid to build up and close the switch 95 and this interval is long enough to allow the valve 98 to be opened and the clutches disconnected. In the event that the interval is not sufficient, a delayed time solenoid may be used at 91 to provide the requisite period during which the clutches are disconnected.

From the foregoing description, it will be seen that I have provided a rugged, efficient and extremely powerful extrusion press which is almost wholly automatic in operation and which is of a minimum cost.

Other forms may be employed embodying the features of my invention instead of the one herein explained, change being made in the form or construction, provided the elements stated by any of the following claims or the equivalent of such stated elements be employed.

I therefore particularly point out and distinctly claim as my invention:

1. In an extrusion press, a base, an extrusion die, an extrusion ram, kinetic energy storage means to simultaneously move said die and said ram with respect to said base in a horizontal plane and means to alternately connect said means to said die and ram to actuate the same.

2. In an extrusion press, a base, an extrusion die, an extrusion ram, kinetic energy storage means to simultaneously move said die and said ram with respect to each other and to said base in a horizontal plane and means to alternately connect said means to said die and ram to actuate the same.

3. In an extrusion press, a base, an extrusion die, an extrusion ram, kinetic energy storage means to simultaneously move said die and ram to and from each other and with respect to said base and means to alternately connect said means to said die and ram to actuate the same.

4. In an extrusion press, a base, a screw member carried by said base, power means to drive said screw member, an extrusion die mounted for movement transversely of said screw member, linkage interconnecting said screw member and said die to shift said die transversely of said screw on rotation of said screw and means operative automatically at the end of an extrusion stroke to return said linkage and said die to a predetermined position.

5. In an extrusion press, a base, a screw member carried by said base, power means to drive said screw member, an extrusion ram mounted for movement transversely of said screw member, linkage interconnecting said screw member and said ram to shift said ram transversely of said screw on rotation of said screw and means operative automatically at the end of an extrusion stroke to return said linkage and said die to a predetermined position.

6. In an extrusion press, a base, a screw carried by said base with a right hand thread and a left hand thread at opposing ends thereof, a threaded block carried on each thread for movement toward or away from each other as said screw is rotated, a member adapted to apply pressure to material undergoing extrusion, a pair of links connected to said member and said blocks respectively to actuate said member as said screw is rotated, flywheel energy storage means mounted adjacent said screw and means to connect said flywheel and said screw to operate the same.

7. In an extrusion press, a base, a screw carried by said base with a right hand thread and a left hand thread at opposing ends thereof, a threaded block carried on each thread for movement toward or away from each other as said screw is rotated, a member adapted to apply pressure to material undergoing extrusion and a pair of links connected to said member and said blocks respectively to actuate said member as said screw is rotated, a flywheel to apply a rotative force to said screw and means to connect and disconnect said flywheel and said screw.

8. In an extrusion press, a base, a screw carried by said base with a right hand thread and a left hand thread at opposing ends thereof, a threaded block carried on each thread for movement toward or away from each other as said screw is rotated, an extrusion ram and die mounted for movement relative to each other, a pair of links operatively connected to said ram and to said blocks respectively, a pair of links operatively connected to said die and said blocks respectively to move said ram and die relative to each other consequent upon rotation of said screw.

HARVEY M. GERSMAN.